(12) United States Patent
Kristensen et al.

(10) Patent No.: US 11,272,713 B2
(45) Date of Patent: Mar. 15, 2022

(54) FISH GUTTING DEVICE WITH CONTROLLABLE CUTTING

(71) Applicant: Kroma A/S, Skive (DK)

(72) Inventors: Ivan Kristensen, Viborg (DK); Daniel Braad Jørgensen, Silkeborg (DK)

(73) Assignee: Kroma A/S, Skive (DK)

( * ) Notice: Subject to any disclaimer, the term of this patent is extended or adjusted under 35 U.S.C. 154(b) by 0 days.

(21) Appl. No.: 17/054,033

(22) PCT Filed: Jun. 12, 2019

(86) PCT No.: PCT/EP2019/065326
§ 371 (c)(1),
(2) Date: Nov. 9, 2020

(87) PCT Pub. No.: WO2019/238743
PCT Pub. Date: Dec. 19, 2019

(65) Prior Publication Data
US 2021/0298317 A1   Sep. 30, 2021

(30) Foreign Application Priority Data

Jun. 15, 2018 (EP) .................................. 18178003

(51) Int. Cl.
*A22C 25/00* (2006.01)
*A22C 25/14* (2006.01)
*A22C 25/08* (2006.01)

(52) U.S. Cl.
CPC ............ *A22C 25/145* (2013.01); *A22C 25/08* (2013.01)

(58) Field of Classification Search
CPC ......... A22C 25/08; A22C 25/12; A22C 25/14; A22C 25/142; A22C 25/145; A22C 25/147; A22C 25/18
(Continued)

(56) References Cited

U.S. PATENT DOCUMENTS

| 3,264,681 A | 8/1966 | Bartels |
| 5,352,152 A | 10/1994 | Claudon |

(Continued)

FOREIGN PATENT DOCUMENTS

| CA | 2301287 A1 | 2/1999 |
| EP | 0258941 | 3/1988 |

(Continued)

OTHER PUBLICATIONS

International Search Report for PCT/EP2019/065326 dated Jul. 26, 2019.

*Primary Examiner* — Richard T Price, Jr.
(74) *Attorney, Agent, or Firm* — Knobbe Martens Olson & Bear LLP (57) ABSTRACT

The invention provides a gutting device for gutting a fish along its abdominal cavity. A blade for cutting the fish open, and a shielding element are movably mounted on a controllable movable arm. The shielding element has a blunt tip, and it is arranged for being in: 1) a retracted position, where the shielding element allows the blade to cut the fish, 2) a tracking position, where the blunt tip of the shielding elements is inside the abdominal cavity of the fish, so as to track the end of the abdominal cavity of the fish, and 3) a shielding position, where the shielding element is pushed upwards by contact with the end of the abdominal cavity at a genital opening of the fish, thereby shielding the blade from further contact with the fish. This provides a precise method for without unintentionally damaging the fish.

11 Claims, 7 Drawing Sheets

(58) Field of Classification Search
USPC .......................... 452/106, 107, 120, 121, 123
See application file for complete search history.

(56) References Cited

U.S. PATENT DOCUMENTS

| | | | |
|---|---|---|---|
| 5,980,376 A | 11/1999 | Grosseholz et al. | |
| 7,179,163 B1* | 2/2007 | Vedsted | A22C 25/14 |
| | | | 452/121 |
| 7,427,229 B2* | 9/2008 | Grosseholz | A22C 25/147 |
| | | | 452/106 |
| 8,512,106 B2* | 8/2013 | Ryan | A22C 25/145 |
| | | | 452/121 |
| 2017/0280735 A1* | 10/2017 | Ryan | A22C 25/17 |

FOREIGN PATENT DOCUMENTS

| | | |
|---|---|---|
| WO | WO 2011/151221 A1 | 12/2011 |
| WO | WO 2016/138945 A1 | 9/2016 |

\* cited by examiner

FISH GUTTING DEVICE WITH CONTROLLABLE CUTTING

CROSS REFERENCE TO RELATED APPLICATIONS

This application is a U.S. National Phase Application of PCT International Application Number PCT/EP2019/065326, filed on Jun. 12, 2019, designating the United States of America and published in the English language, which is an International Application of and claims the benefit of priority to European Patent Application No. 18178003.2, filed on Jun. 15, 2018. The disclosures of the above-referenced applications are hereby expressly incorporated by reference in their entireties.

FIELD OF THE INVENTION

The present invention relates to a fish processing, especially gutting of fish and a method for processing fish by means of a fish processing machine. Especially, the invention provides a fish processing machine and a method for cutting open the abdominal cavity of the fish in a controllable manner for effectively opening the abdominal cavity and still providing a precise cut without damaging the fish.

BACKGROUND OF THE INVENTION

Processing machines for automatically gutting and cleaning a fish are known. Such machines may especially remove viscera of the fish through an abdominal opening, e.g. by means of a suction device or the like.

However, it is a problem with known automatic fish processing machines that the process of cutting open the abdominal cavity in a fast manner is difficult without damaging the fish, or at least some fish when a large number of fish are processed. Especially, it is a problem that valuable meat of the fish is cut unintentionally in the automatic cutting process.

SUMMARY OF THE INVENTION

In particular, it may be seen as an object of the present invention to provide a solution to the mentioned problem of cutting open the abdominal cavity of a fish in a fast manner suited for an automated fish processing machine, but with a low risk of damaging the fish.

In a first aspect, the invention provides a gutting device for gutting a fish along its abdominal cavity upon being transported along a transport direction with its head pointing forward in the transport direction, the gutting device comprising

- a movable arm capable of moving along at least two axes, one axis being the transport direction, wherein a position of the movable arm is controlled by a controllable actuator,
- a blade arranged on the movable arm, wherein the blade is arranged for opening the abdominal cavity of the fish, by cutting along an abdominal seam of the fish, and
- a shielding element with a blunt tip, the shielding element being movably arranged on the movable arm, so as to be arranged to track the abdominal cavity of the fish, the shielding element being configured for being in:
  - a retracted position, where the shielding element is in a position to allow the blade to cut the abdominal cavity of the fish,
  - a tracking position, where the blunt tip of the shielding elements is inside the abdominal cavity of the fish, so as to track an end of the abdominal cavity of the fish, and
  - a shielding position, where the shielding element is pushed upwards by contact with the end of the abdominal cavity at a genital opening of the fish, thereby shielding the blade from further contact with the fish.

Such gutting device is advantageous, since the shielding element as defined has been proven to be capable of hindering that the blade cuts too far towards the genital opening of the fish. By having the shielding element tracking the abdominal cavity, the shielding element will automatically be pushing upwards, by the end of the abdominal cavity, thereby entering the shielding position, where the shielding element serves to shield the blade from cutting too far. This has the effect that the shielding element helps to prevent cutting into valuable meat of the fish, thus damaging the fish. The device has especially be proven to be successful for gutting salmon, sea trout etc.

In the following, preferred embodiments and features will be described.

In preferred embodiments, the shielding element comprises a protruding element with a blunt tip, preferably an elongated protruding element, being hinged by at least one joint, preferably hinged by two joints, so as to conform to the shape of the abdominal cavity of the fish, specifically so as to be able to follow the shape of the end of the abdominal cavity. Especially two joints have proven superior to be able to track the abdominal cavity of the fish with a high precision, and upon reaching the end of the abdominal cavity to shield the blade from further contact with the fish, thus ensuring that the shielding element will stop the blade from cutting too far. Especially, the protruding element may be hinged to a pivot mechanism mounted to pivot around a pivotal axis perpendicular to a longitudinal axis of the protruding element. In a preferred embodiment, the protruding element is hinged to the pivot mechanism to pivot around a second pivotal axis perpendicular to the longitudinal axis of the protruding element. Specifically, this pivot mechanism may be rotated by a controllable actuator so as to rotate the shielding element between the tracking position and the retracted position. In a specific compact embodiment, the blade is a circular blade arranged for rotating around a rotation axis parallel with said pivotal axis of the shielding element, such as comprising a motor for rotating the circular blade. Especially, the circular blade and the pivotal axis of the shielding element may be the same axis. The circular blade may have a diameter of such as 40 mm to 200 mm, such as 50 mm to 150 mm, such as 100 mm to 140 mm.

The shielding element may be arranged to move from the retracted position to the tracking position by means of a controllable actuator. Further, a controller may be arranged to cause the controllable actuator to move the shielding element from the retracted position to the tracking position. Further, the controller may be arranged to move the shielding element from the shielding position to the retracted position. Especially, the controllable actuator may comprises a controllable pneumatic actuator, or another type of controllable actuator, such as a servo motor etc.

The device may comprise a controller arranged to control the controllable actuator for controlling movement of the movable arm, e.g. a controllable pneumatic actuator or another type of motor. The movable arm may be connected to a controller for controlling position of the movable arm, e.g. for determining a starting point on the fish from where to start cutting the fish with the blade, and wherein the controller is arranged to control the movement of the movable arm in accordance with the starting point on the fish. The movable arm is preferably hinged to be able to move in a vertical direction as well as in a direction along the transport direction of the fish, so as to allow lowering for allowing the blade to enter into contact with the fish, and in an upper position where the blade is out of contact with the fish. Further, the arm should be capable of moving the blade in the transport direction for start cutting at a head end of the fish. During cutting, the movable arm may be controlled to maintain a constant vertical position, and the starting and ending points may be predetermined based on a predetermined length and position of the fish.

The gutting device may especially be dimensioned for gutting a fish having a total length of 10 cm to 120 cm.

In preferred embodiment, the shielding element has a protruding element with a through-going longitudinal opening arranged to receive the blade. E.g. the length of the protruding element is within 1-20 cm, such as 2-15 cm, such as 3-10 cm.

In a second aspect the invention provides a fish processing machine comprising
a stationary structure,
a conveyor belt arranged to transport the fish on its backside along a transport direction with its head pointing forward in the transport direction, and
a gutting device according to the first aspect, wherein the movable arm is mounted on the stationary structure.

It is to be understood that such fish processing machine may comprise further elements, such as for cleaning the abdominal cavity of the fish after being cut open, such as suction means, a brush, a spinning wheel or a cleaning device using water to remove viscera from the fish etc.

In a third aspect, the invention provides a method for automatic gutting of a fish by operating a blade and a shielding element with a blunt tip, wherein the blade and the shielding element are mounted on a movable arm, the method comprising
moving the blade to a position for opening the abdominal cavity of the fish,
cutting the abdominal cavity open from a head end of the fish,
operating the shielding element from a retracted position where it allows the blade to cut the abdominal cavity of the fish and into a tracking position,
moving the shielding element to enter the abdominal cavity opening,
tracking the abdominal cavity of the fish by means of the blunt tip of the shielding contacting the end of the abdominal cavity of the fish, along with the blade opening the abdominal cavity towards the genital opening of the fish, and
entering a shielding position of the shielding element, where the shielding element is pushed upwards by contact with the end of the abdominal cavity at a genital opening of the fish, thereby shielding the blade from further contact with the fish.

The method is suited for use in an automated fish processing machine under control of a computer or other automated controller.

It is to be understood that features and embodiments of the mentioned aspects of the present invention may each be combined with any of the other aspects.

BRIEF DESCRIPTION OF THE FIGURES

The fish gutting device according to the invention will now be described in more detail with regard to the accompanying figures. The figures show one way of implementing the present invention and is not to be construed as being limiting to other possible embodiments falling within the scope of the appended claim set.

DETAILED DESCRIPTION OF EMBODIMENTS

FIGS. 1a-1d shows different stages of the shielding element SE for a preferred embodiment of the gutting device. A movable arm MA carries a blade BL and the shielding element SE. The movable arm is arranged to move in the transport direction and in a vertical direction, i.e. here perpendicular to the transport direction TD, which is preferably horizontal. In a fully automated version, the movable arm is actuated by a controllable actuator in response to a predetermined position and size of the fish F, so as to be able to control the position of the movable arm in relation to the fish F and its position when moving in the transport direction TD, so as to cut open the abdominal cavity of the fish F from a starting position in its head end, and to an end position just before the genital opening of the fish.

The blade BL in this embodiment is circular shaped and mounted and it is arranged for rotating around axis P1 for efficient cutting of the fish F, which is seen lying on its back with its head in a transport TD. E.g. the fish F may be arranged on a conveyor (not shown), and the gutting operation may be performed during transporting in the transport direction TD for efficient processing, or the fish F may be stationary or slowed down during this operation, if preferred.

The shielding element SE has an elongated protruding element PE with a blunt tip TP (not shown as blunt in this view) which is arranged for moving inside the abdominal cavity and to contact the end wall of the abdominal cavity of the fish F, where the blade BL should stop cutting the fish F, so as to not damage valuable parts of the fish F. The protruding element PE is hinged at point P2 to a pivot mechanism PM which is arranged to pivot around axis P1, i.e. the rotation axis for the blade BL. The pivot mechanism PM is driven by a controllable pneumatic actuator (not shown). Thus, effectively, the protruding element PE is hinged at two points P1 and P2.

Figure 1A:
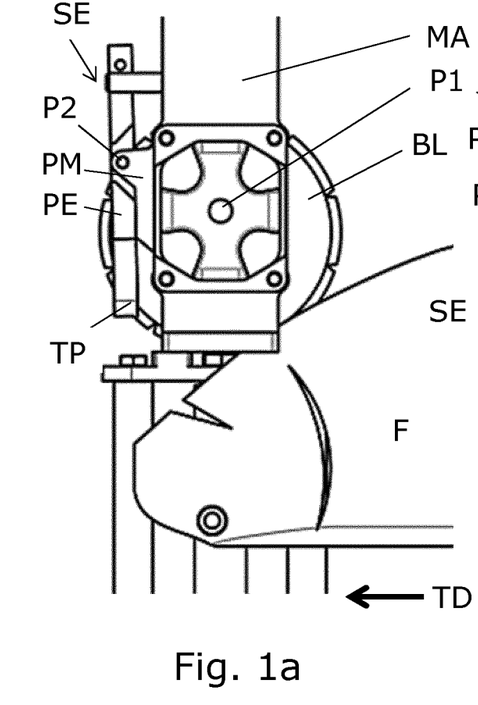
FIGS. 1a-1d show for an embodiment side view of the position of shielding element and circular blade in different stages during opening of the abdominal cavity of a fish.

In FIG. 1a, the shielding element SE is in a retracted position, i.e. where the pivot mechanism PM is turned, so that the protruding element PE is retracted from any contact with the fish F, and in a position so that the blade BL can start cutting the abdominal cavity of the fish F at a starting position in the head end.

Figure 1B:
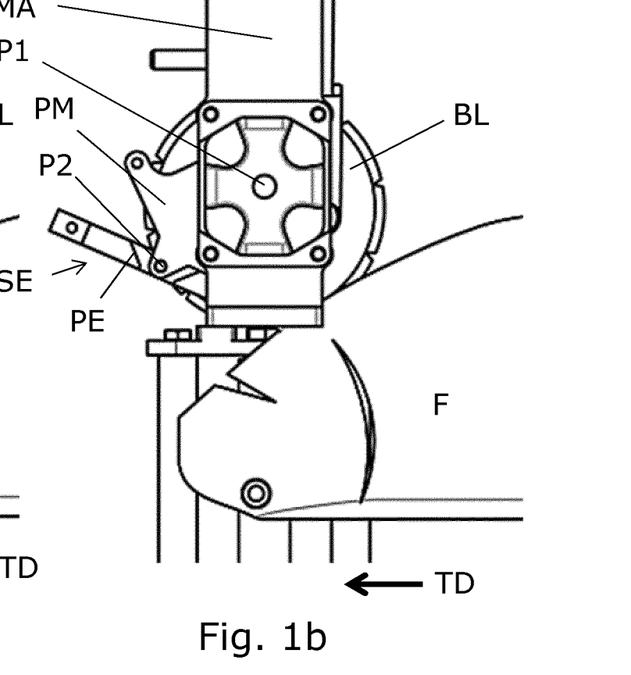

In FIG. 1b, the shielding element SE is on its way from the retracted position to a tracking position, namely where the pivot mechanism PM has been turned counter clockwise so that the protruding element PE enters the opening in the fish F which has already been cut by the blade BL.

Figures 1C, 1D:
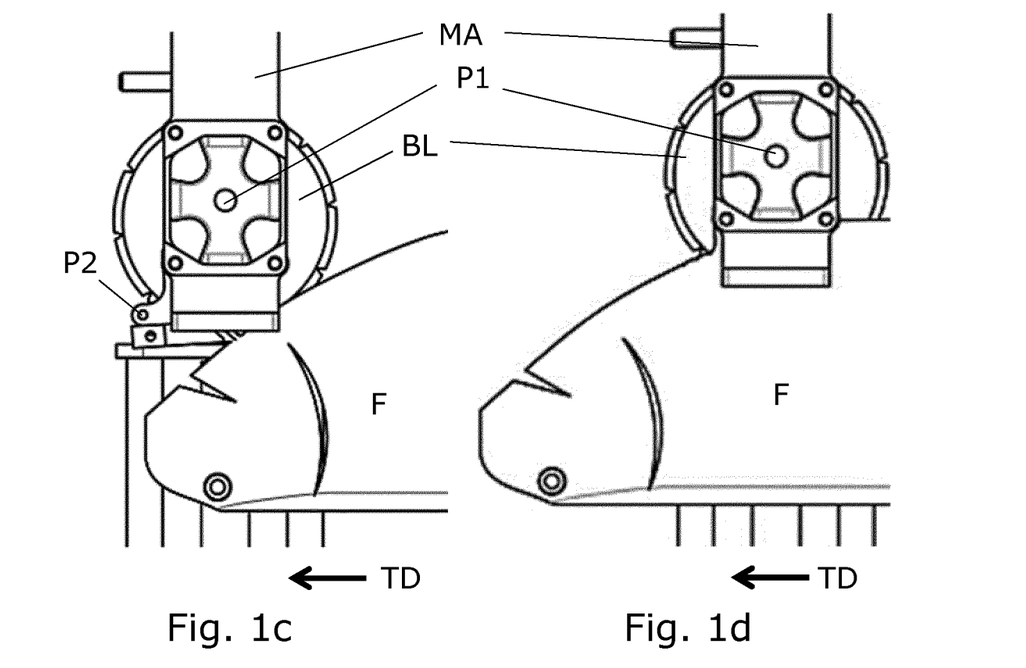

In FIG. 1c, the shielding element SE in the tracking position, where the protruding element PE has entered the abdominal cavity of the fish F. Here, the tip TP of the protruding element PE is preferably kept in the abdominal cavity of the fish F, e.g. 20-40 mm below a vertical top point of the abdominal cavity, so as to track the abdominal cavity with the purpose of detecting its end wall by contact between the tip TP and this end wall.

In FIG. 1d, the shielding element SE is still in the tracking position, i.e. the protruding element PE tip TP is inside the abdominal cavity of the fish F. This continues along with cutting in the opposite direction of the transport direction TD, until the abdominal end wall is reached, and thus pushes the protruding element PE upwards into a shielding position, where the protruding element PE shields the blade BL from further contact with the fish F, thereby hindering an unintentional cutting too close to the genital opening. After the shielding position is obtained, the tip TP of the shielding element SE will guide the shielding element SE out of the fish F, while shielding the blade BL from cutting the fish F to far towards its genital opening. The movable arm MA may be in the same vertical position during cutting of the abdominal cavity, and the movable arm MA can be controlled to move upwards by a controller based on a predetermined length of fish F.

The gutting device has been found to prevent cutting of valuable parts of the fish F with a very high degree of reliability.

Figure 2A:
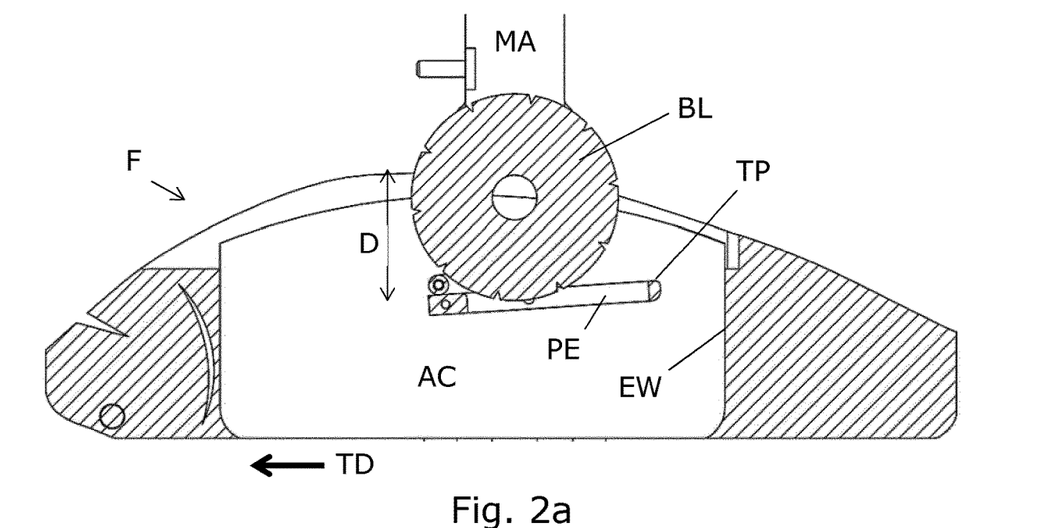
FIGS. 2a and 2b show the position of the protruding element in relation to the fish in the tracking and in the shielding position.
Figure 2B:
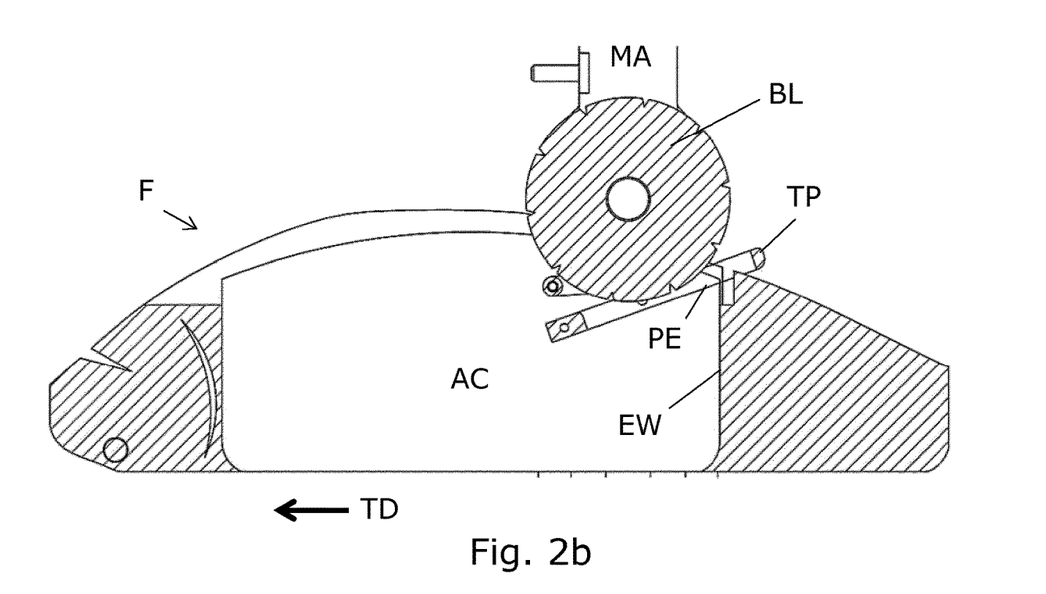

FIGS. 2a and 2b show side section views where the abdominal cavity AC of the fish F is visible, and where the shielding element is in two different positions during the opening of the abdominal cavity AC of the fish F.

In FIG. 2a, the shielding element is in a tracking position, i.e. where the protruding element PE is in a horizontal or slightly tilted upwards compared to horizontal position. In FIG. 2a, the blade BL is cutting the fish F. Especially, the movable arm MA may be controlled to maintain a constant vertical position, so that the protruding element PE will move inside the abdominal cavity AC of the fish F tracking position at a depth D of 20-40 mm below abdominal cavity top point of the fish F.

In FIG. 2b, the tip TP of the shielding element has reached the end wall EW of the abdominal cavity AC, and via the rounded shape of the tip TP, the tip TP will slide upwards along the end wall EW, thus pushing the protruding element PE upwards, i.e. increasing its tilting compared to horizontal position. Hereby, the protruding element PE will be tilted to shield the blade BL from further contact with the fish F. Thus, the cutting will stop at this point. In FIG. 2b, the protruding element PE is seen in the position where it has been pushed out of the abdominal cavity AC of the fish F.

Figure 3A:
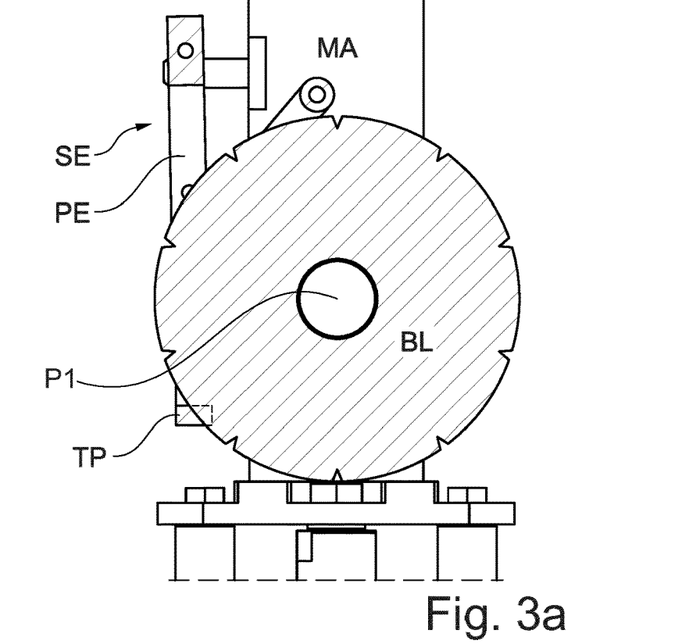
FIGS. 3a and 3b show for the embodiment of FIG. 1, the position of shielding element and circular blade in different stages, in a different side view than FIG. 1, FIGS. 4a and 4b show the same stages as in FIG. 2, but in a see-through side view, the embodiment in different stages.
Figure 3B:
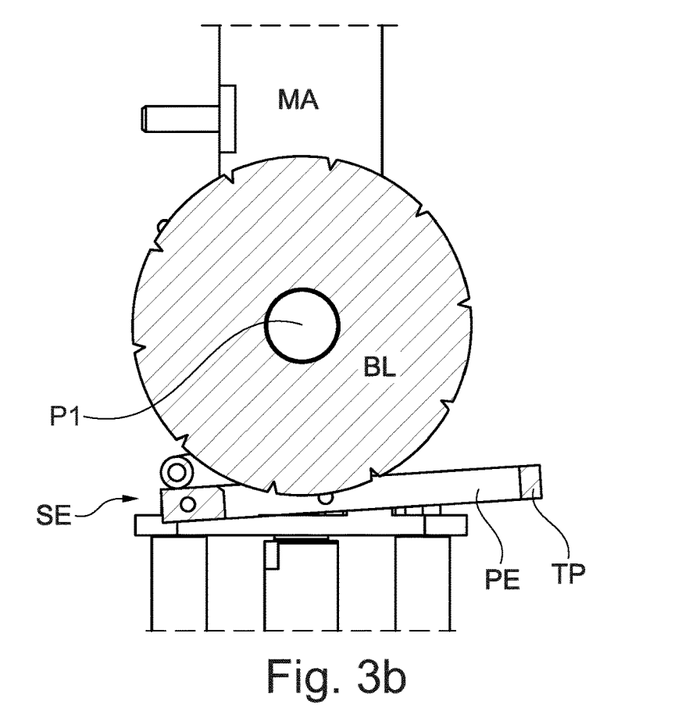

FIGS. 3a and 3b show a side section view with the shielding element SE in two different states. The protruding element PE appears to be hidden behind the blade BL, but this is due to the view which is a section along a longitudinal protruding element PE. The protruding element PE has a (not visible) longitudinal through-going opening for receiving at least the edge of the blade BL.

In FIG. 3a, the shielding element SE is in the retracted stage, i.e. the protruding element is in a vertical position, thus allowing a lower part of the circular blade BL is free for cutting a fish.

In FIG. 3b, the shielding element SE is in a shielding state, where the protruding element PE has been turned by counter clockwise about 90°-100° by the pivot mechanism PM, compared to the retracted state, so that the protruding element PE is here in a horizontal position, or slightly tilted upwards compared to horizontal. It is seen that the protruding element PE at least partly shields the blade BL from cutting the fish, since at least the lower part of the blade BL is shielded from contact with the fish, which is to be placed below the blade BL.

Figure 4A:
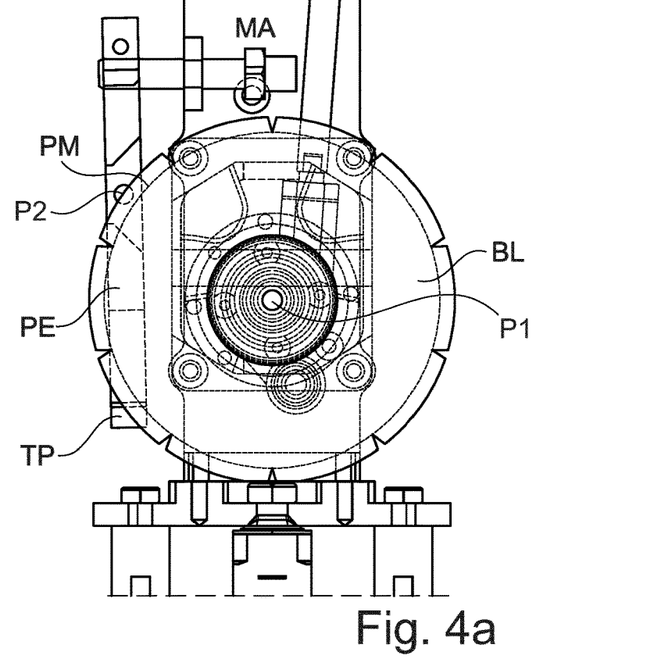
Figure 4B:
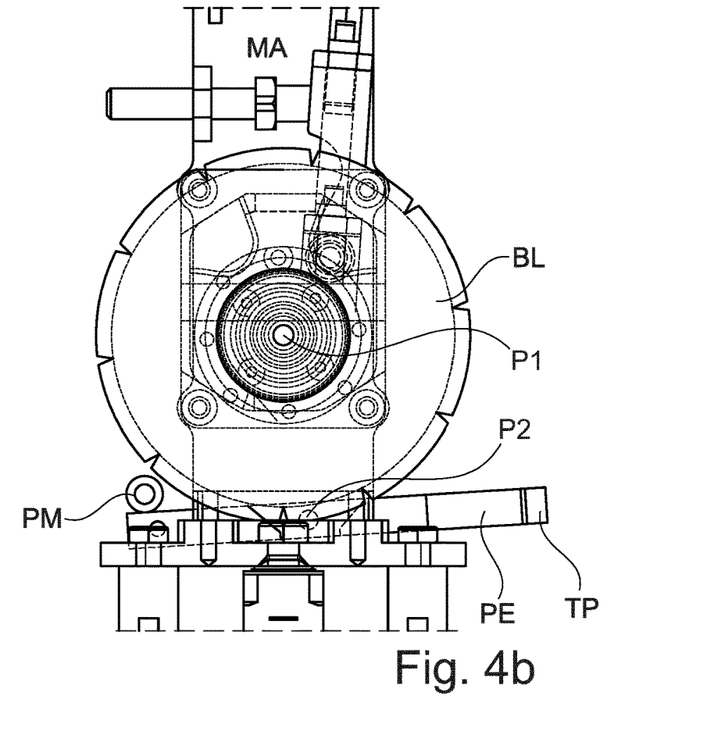

FIGS. 4a and 4b show, as FIGS. 3a and 3b, for the same embodiment, a side view with the shielding element SE in a retracted state, and in a shielding state, respectively. In FIGS. 3a and 3b, the side view is a wire frame, thus allowing a view through the various elements.

Figure 5A:
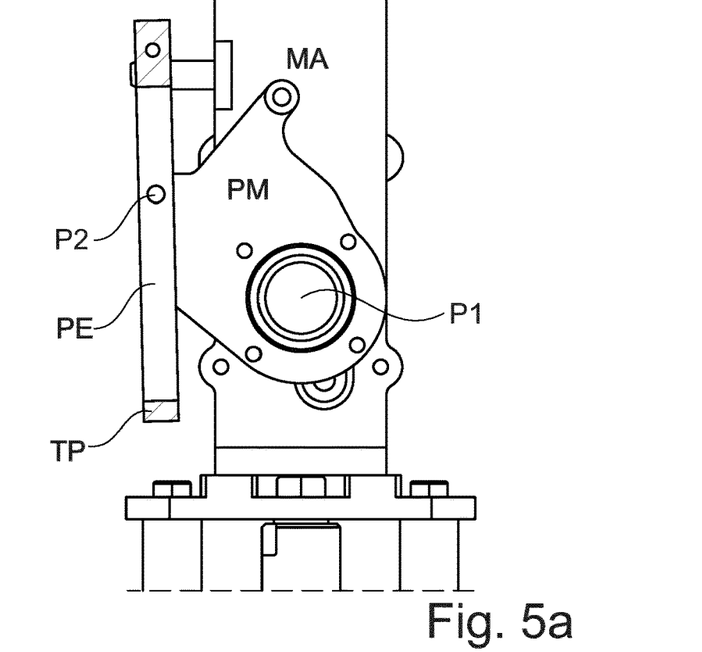
FIGS. 5a and 5b show yet another side view with the pivot mechanism of the shielding element visible.
Figure 5B:
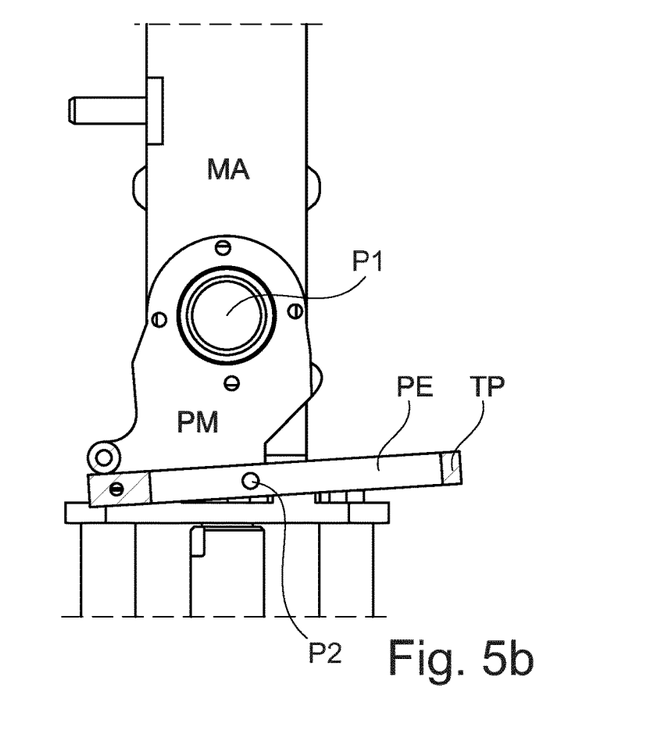

FIGS. 5a and 5b show, still as in FIGS. 3a and 3b, for the same embodiment, a side view with the shielding element SE in a retracted state, and in a shielding state, respectively. In the view of FIGS. 5a and 5b, the blade BL removed, so as to allow the pivot mechanism PM to be visible, and thus also the pivot points P1 and P2 around which the protruding element PE is hinged.

Figure 6:
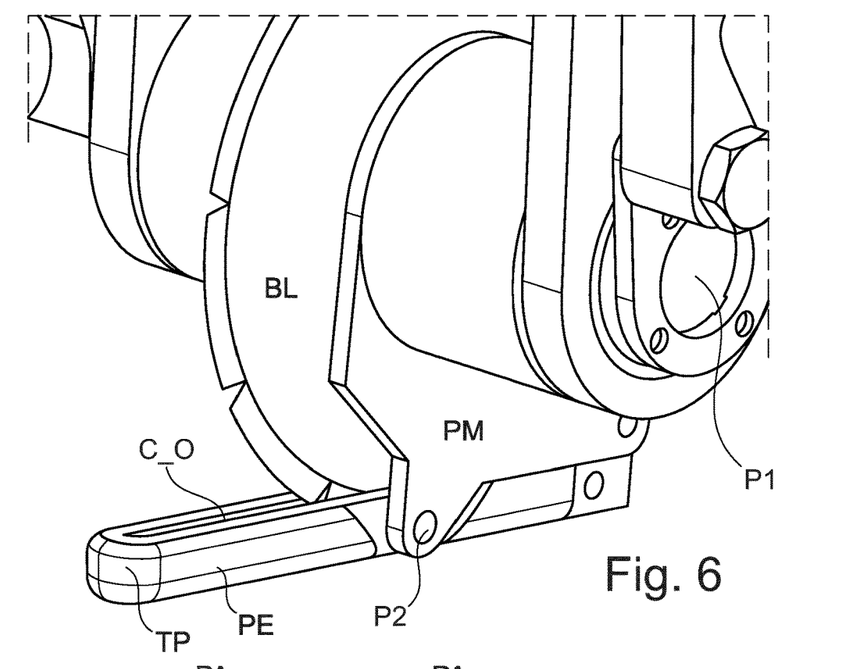
FIG. 6 shows a 3D view of the embodiment with the shielding element in the tracking position.

FIG. 6 shows a 3D view of the embodiment from FIGS. 3-5, here shown with the protruding element PE in the shielding position, where it is horizontal, thus shielding the lower part of the blade BL. The blunt tip TP is visible in this illustration, as well as the central longitudinal through-going opening C_O in the protruding element PE for receiving the blade BL. The tip TP is curved or rounded, so as to allow moving inside the abdominal cavity line of the fish without damaging the fish.

Figure 7:
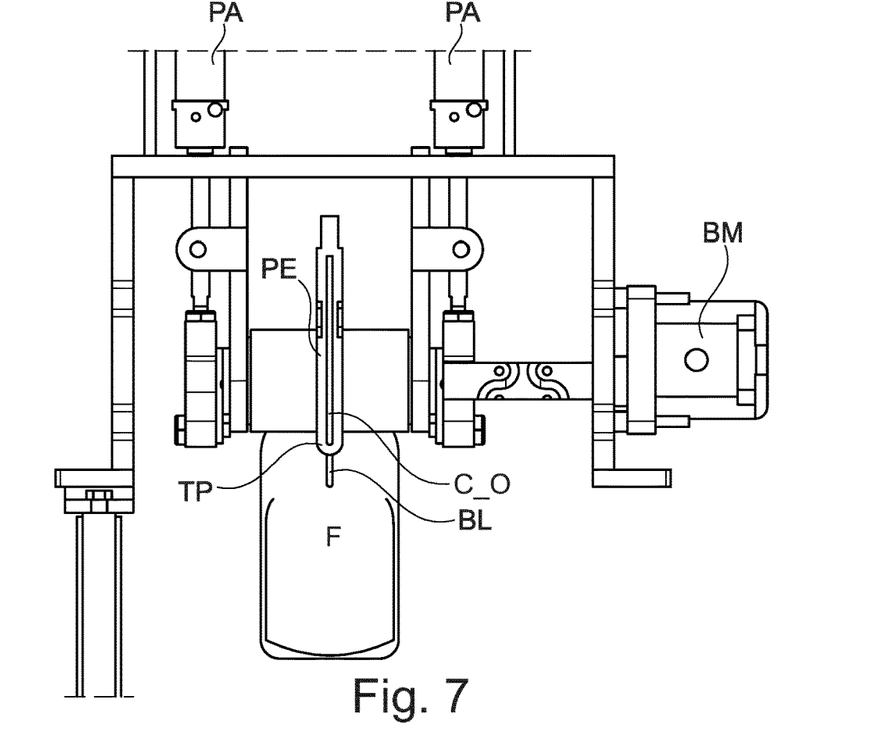
FIG. 7 shows a front view of still the same embodiment with the shielding element in the retracted position.

FIG. 7 shows a frontal view of the embodiment from the previous figures. Here, the fish F is seen from its head side, and thus the edge of the blade BL is visible in this view. The turning of the pivot mechanism is controlled by two pneumatic actuators PA, one on each side. The rotation of the blade BL is provided by a blade motor BM, e.g. an electric motor. The blade motor BM drives the blade via a cardan shaft.

Figure 8A:
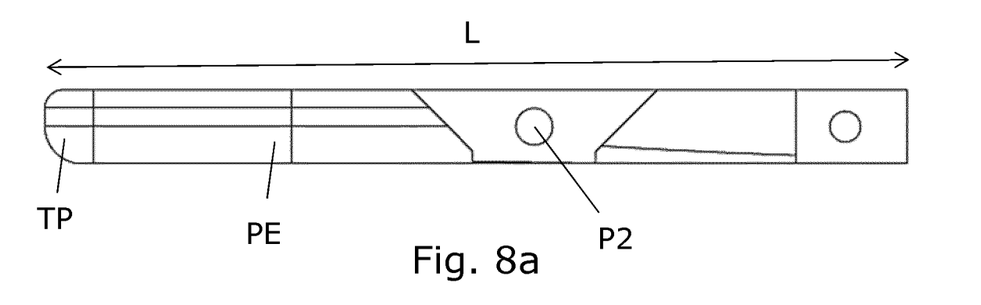
FIGS. 8a, 8b, 8c show different views of the protruding part of the shielding element with the blunt tip and central opening for the blade visible.
Figures 8B, 8C:
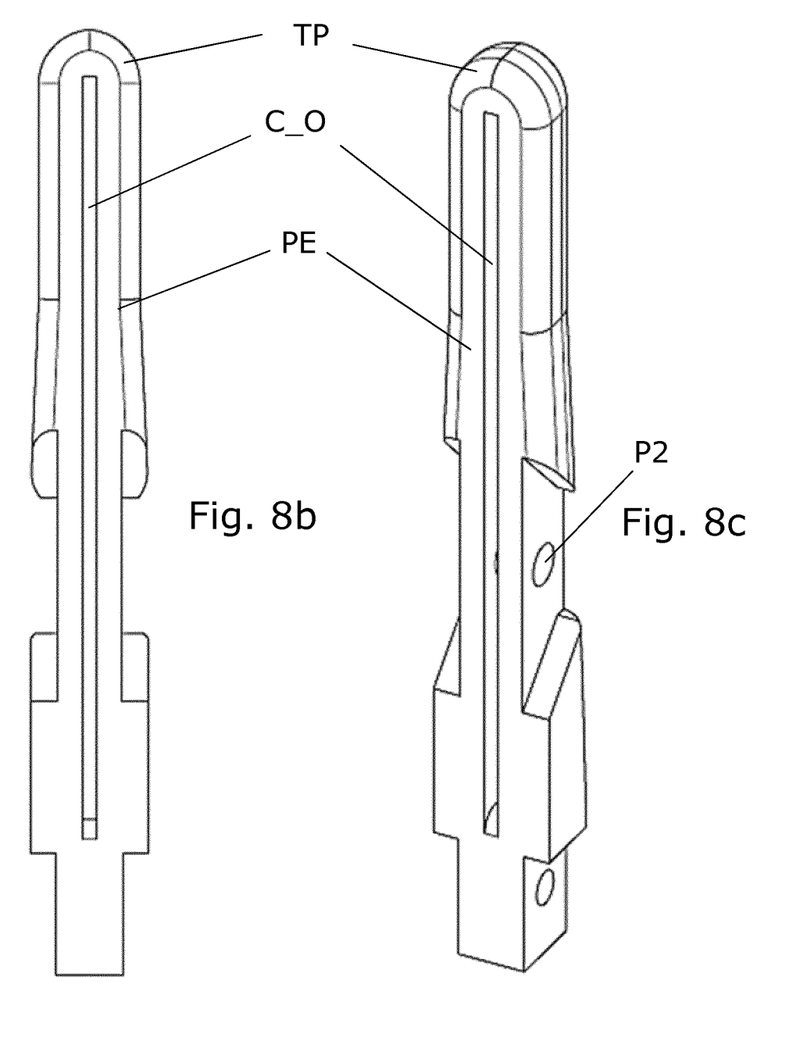

FIGS. 8a-8c show various views of an embodiment of the protruding element PE, where a preferred shape of the blunt tip TP of the protruding element can be seen. The total length L of the protruding element in a preferred embodiment is 140 mm, but it may in general be such as 80 mm to 200 mm. The width of the protruding element may be such as 5-20 mm.

The protruding element has a central opening C_O for receiving the blade BL in tracking position and in the shielding position.

The position of the hinge for attachment to the pivot mechanism at pivot point P2, is preferably positioned at a distance of such as 80 mm from the tip TP, but in general this may be such as 40 mm to 140 mm.

To sum up, the invention provides a gutting device for gutting a fish along its abdominal cavity. A blade for cutting the fish open, and a shielding element are movably mounted on a controllable movable arm. The shielding element has a blunt tip, and it is arranged for being in: 1) a retracted position, where the shielding element allows the blade to cut the fish, 2) a tracking position, where the blunt tip of the shielding elements is inside the abdominal cavity of the fish, so as to track the end of the abdominal cavity of the fish, and 3) a shielding position, where the shielding element is pushed upwards by contact with the end of the abdominal cavity at a genital opening of the fish, thereby shielding the blade from further contact with the fish. This provides a precise method for without unintentionally damaging the fish.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A gutting device for gutting a fish along its abdominal cavity upon being transported along a transport direction with its head pointing forward in the transport direction, the gutting device comprising:
 a movable arm capable of moving along at least two axes, one axis being the transport direction, wherein a position of the movable arm is controlled by a controllable actuator,
 a blade arranged on the movable arm, wherein the blade is arranged for opening the abdominal cavity of the fish, by cutting along an abdominal seam of the fish, and
 a shielding element having a blunt tip, the shielding element being movably arranged on the movable arm, so as to be arranged to track the abdominal cavity of the fish, the shielding element being configured for being in:
  a retracted position, where the shielding element is in a position to allow the blade to cut the abdominal cavity of the fish,
  a tracking position, where the blunt tip of the shielding element is inside the abdominal cavity of the fish, so as to track and end at the abdominal cavity of the fish, and
  a shielding position, where the shielding element is pushed upwards by contact with the end of the abdominal cavity at a genital opening of the fish, thereby shielding the blade from further contact with the fish,
 wherein the shielding element comprises a protruding element with a blunt tip, said protruding element being hinged by at least one joint, so as to allow the shielding element to conform to the shape of the abdominal cavity of the fish,
 wherein the protruding element is hinged to a pivot mechanism mounted to pivot around a first pivotal axis perpendicular to a longitudinal axis of the protruding element, and
 wherein the protruding element is hinged to the pivot mechanism to pivot around a second pivotal axis perpendicular to the longitudinal axis of the protruding element.

2. The gutting device according to claim 1, wherein the blade is a circular blade arranged for rotating around a rotation axis parallel with said first pivotal axis) of the shielding element.

3. The gutting device according to claim 1, wherein the rotation axis of the circular blade coincides with the pivotal axis of the shielding element.

4. The gutting device according to claim 1, wherein the protruding element has a through-going longitudinal opening arranged to receive the blade.

5. The gutting device according to claim 1, wherein the shielding element is arranged to move from the retracted position to the tracking position by means of a controllable actuator.

6. The gutting device according to claim 5, comprising a controller arranged to cause the controllable actuator to move the shielding element from the retracted position to the tracking position.

7. The gutting device according to claim 6, wherein the controller is arranged to move the shielding element from the shielding position to the retracted position.

8. The gutting device according claim 1, comprising a controller arranged to control the controllable actuator for controlling movement of the movable arm.

9. The gutting device according to claim 8, wherein the controller is arranged to control a vertical movement of the movable arm in accordance with a predetermined position relative to the fish.

10. The gutting device according to claim 1, dimensioned for gutting a fish having a total length of 10 cm to 120 cm.

11. A fish processing machine comprising:
 a stationary structure,
 a conveyor belt arranged to transport the fish on its backside along a transport direction with its head pointing forward in the transport direction, and
 a gutting device according to claim 1, wherein the movable arm is mounted on the stationary structure.

* * * * *